INVENTOR
CHESTER A. ALBOSTA

Nov. 16, 1965  C. A. ALBOSTA  3,218,440

PRESSURE DEVICE FOR USE WITH TRANSDUCER

Filed Aug. 31, 1961  2 Sheets-Sheet 2

United States Patent Office 3,218,440
Patented Nov. 16, 1965

3,218,440
PRESSURE DEVICE FOR USE WITH
TRANSDUCER
Chester A. Albosta, Johnson City, N.Y., assignor to International Business Machines Corporation, New York, N.Y., a corporation of New York
Filed Aug. 31, 1961, Ser. No. 135,365
5 Claims. (Cl. 235—61.11)

This invention relates to apparatus including pressure means for maintaining a moving document in intimate contact with the effective portion of a stationary transducer, such as an electro-magnetic write head, magnetizing head, or read head.

It is now common practice to imprint magnetizable ink indicia on bank checks to identify, for example, the payor, amount and the bank on which the check is drawn. As each check moves past a magnetizing head in a high-speed reader-sorter machine, this indicia is magnetized. Thereafter, as each check passes a magnetic read head, the indica is read out to control the pocket into which the check is sorted. If the check is permitted to move as much as a few thousandths of an inch away from a magnetic head, the signal level is lowered to a degree where the indicia is not fully magnetized by the magnetizing head or is unreadable or at least not reliably readable by the read head. Errors resulting from inability to read or from incorrect reading may result, for instance, in charges to the wrong depositor or bank, or in the wrong amount to a particular depositor, or some other equally intolerable situation.

It is therefore imperative that the surface of each check on which the magnetic indicia is imprinted be maintained in intimate effective contact with the gapped portions of the magnetizing head and then the read head while the checks are in motion. This intimate contact must be effected by some resilient or yieldable means because the checks vary in weight, thickness, stiffness and condition.

It has heretofore been proposed to provide a resiliently biased pressure pad or a resilient rubber pressure roll in an attempt to maintain each check in effective contact with each magnetic head. If a check has folds or creases, the resultant increase in localized thickness of the check forces the pressure pad or indents the pressure roll a slight distance away from the head. A short time (measured in microseconds) thereafter is required for the pad or roll to return the check into effective contact with the head. In check reader-sorter machines with high speed transport systems, it has been found that at least a portion of a magnetic character rearward of a crease or fold or other discontinuity can be inadequately magnetized by a magnetizing head due to a reduction in effective field strength during the short time interval before effective contact of the check with the head is re-established. Similarly, at least a portion of a magnetic character rearward of a crease or fold can be unreliably read by a magnetic read head because such character or characters will pass by the head during the short time interval before effective contact of the check with the head is re-established.

The principal object of this invention is therefore to provide an improved means for maintaining a moving document in effective contact with a stationary transducer.

Another object is to provide an improved pressure means comprising a plurality of independently flexible fingers for resiliently maintained a moving bank check in effective contact with a stationary magnetic transducer, despite variations in weight, thickness, stiffness and condition of the checks.

Another object is to provide an improved pressure means associated with a transducer to permit the transducer to perform a desired control operation on folded, creased or torn documents without requiring pre-conditioning thereof and without mutilating the leading edges of the documents.

According to these objects, the improved pressure means comprises a rotating member comprising a plurality of bristle-like independently flexible fingers densely arranged around and projecting outwardly from a cylindrical hub or core. These fingers are successively brought into pressing contact with the document to resiliently urge the latter toward effective contact with the transducer. The member is preferably rotated at a velocity at least equivalent to the lineal transport speed of the document to prevent the leading edges of the documents from being driven into and mutilated by the fingers.

The foregoing and other objects, features and advantages of the invention will be apparent from the following more particular description of a preferred embodiment of the invention, as illustrated in the accompanying drawings.

Figure 3A:
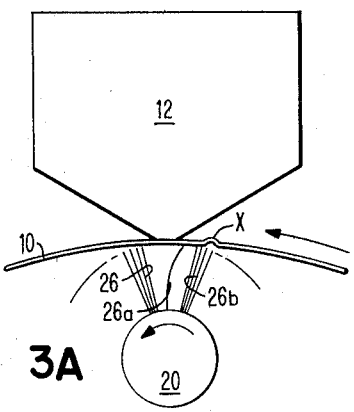
Figure 3B:
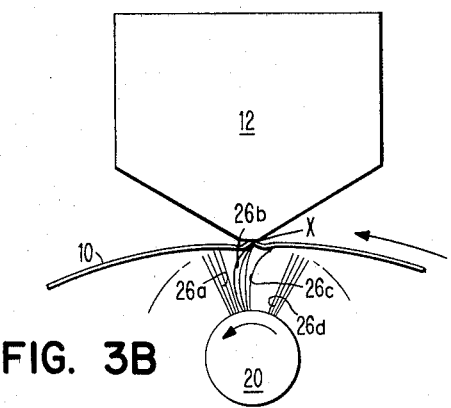
Figure 3C:
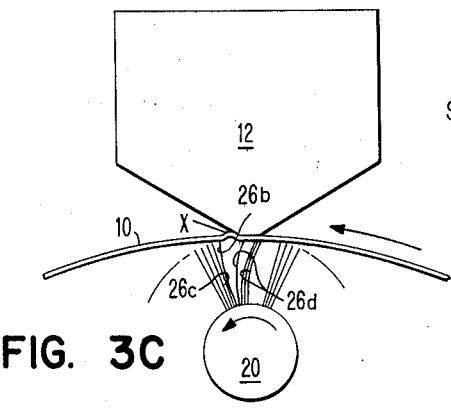
Figure 4:
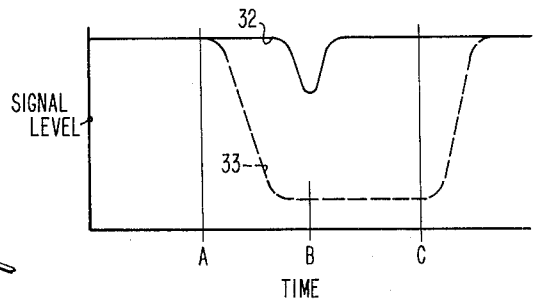

FIGS. 3A, 3B and 3C are enlarged diagrammatic views illustrating the sequential operation of the fingers of the improved pressure means as a document having a crease or fold moves past an electro-magnetic head; and FIG. 4 is a magnetic head signal level vs. time graphic comparison of the operating characteristics of a pressure means embodying the invention with a pressure means of the resilient roller type heretofore proposed.

Figure 1:
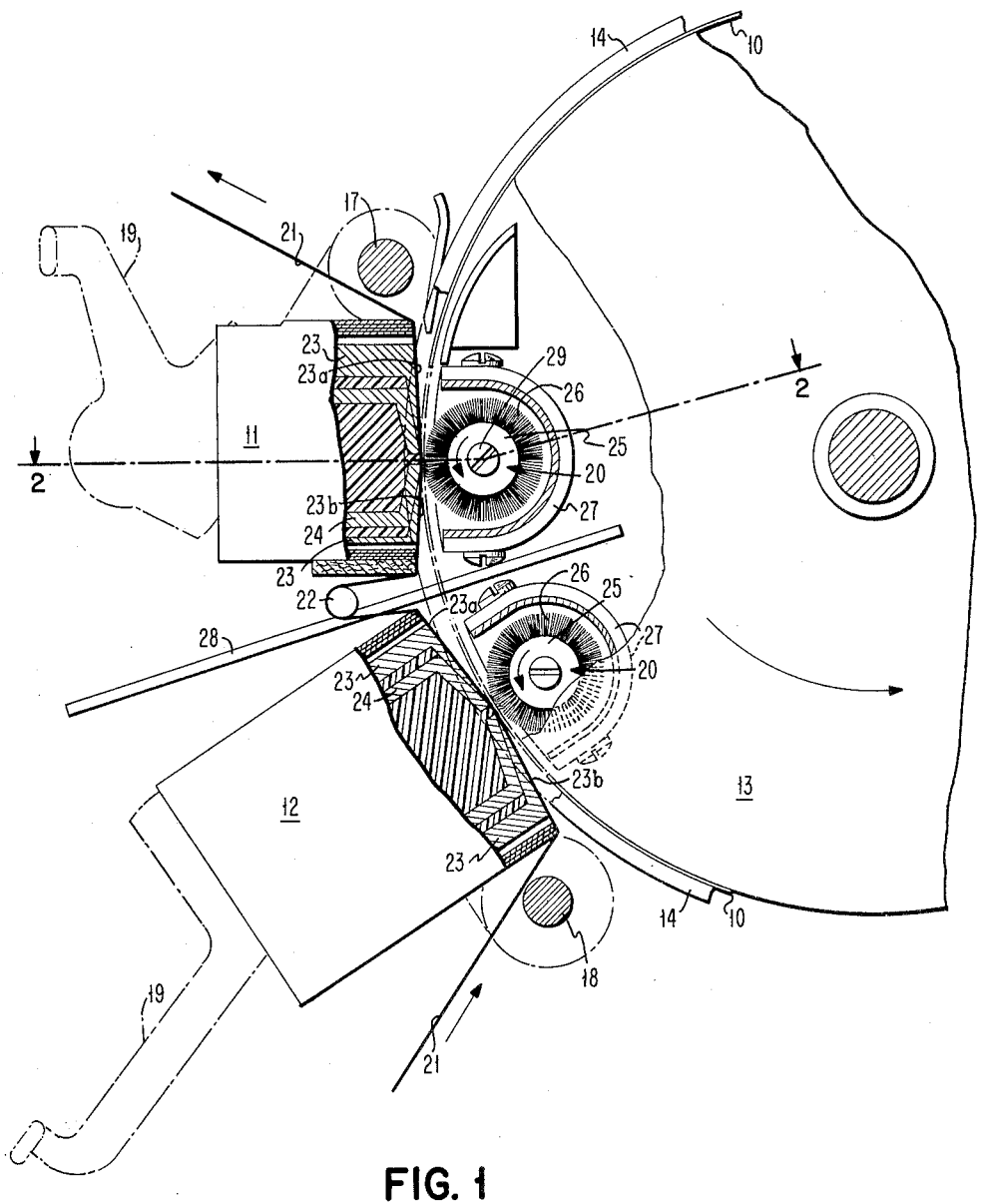
FIG. 1 is a side elevation view, partly broken away, of a portion of a bank check reader-sorter machine having a pressure means embodying the invention.
Figure 2:
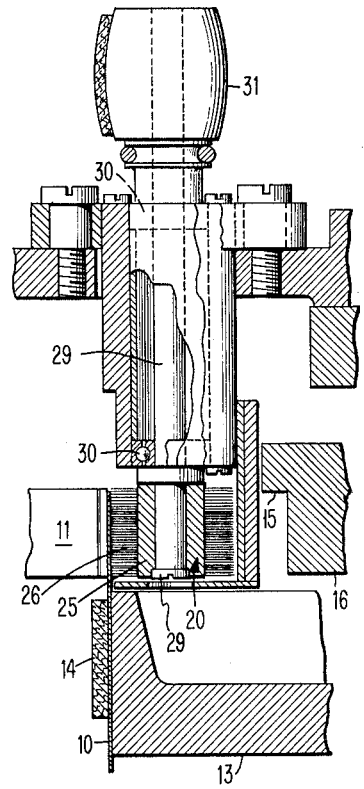
FIG. 2 is a section taken along the line 2—2 of FIG. 1.

As shown in FIGS. 1 and 2, documents such as bank checks 10 are advanced serially along a predetermined path and successively past transducers 11 and 12 by suitable advancing means. As illustrated, this advancing means comprises a rotating drum 13 and a pulley-driven belt 14, which drive the checks at a preselected transport speed.

Belt 14 has a run which impinges on a substantial arcuate part of the drum periphery so that each check will be effectively pinched and positively driven for a substantial distance around the drum. The drum 13 and belt 14 have driving contact with only a portion of the check lying between the inner and outer longitudinal edges thereof, thus leaving a zone of the check which overlies the inner edge of drum 13. This zone is of constant width because each check, before moving past the transducers 11 and 12, will have had its inner longitudinal edge prealigned by registration against an aligning shoulder 15 on a rotating aligning drum 16. The aligning drum 16 and drum 13 are at the same side of the check path, but are disposed in overlapping relation such that each check will be pre-aligned on drum 16 before passing on to drum 13. Since details of the drums 13 and 16 and of belt 14 and their drives are not essential to an understanding of the present invention, they will not be more fully described herein; however, if such details are desired, the reader is referred to the allowed co-pending application of Buslik and Weidenhammer, U.S. Serial No. 783,881 filed December 30, 1958, now U.S. Patent No. 3,012,775 assigned to the assignee of the present invention.

The transducers 11, 12 are hingedly carried on pins 17, 18, respectively, so they may be rocked toward and away from the check path. Locking levers 19 are manually operable to lock the transducers 11, 12 beside the check path.

Each check 10 has characters or other indicia which are imprinted thereon in magnetizable ink within the aforemention constant width zone adjacent the aligned inner longitudinal edge of each check. As illustrated, transducer 11 is a magnetizing head which magnetizes the magnetizable ink characters as they are moved past the gap of said head. Transducer 12 is a magnetic head head which reads the magnetic characters by generating electrical signals corresponding to changes in magnetic flux as the magnetized characters pass the gap of said head.

In order that all characters will be fully magnetized by transducer 11 and that all characters will be reliably read by transducer 12, the checks must be maintained in effective intimate contact with the gap portion of the transducers as the checks are moved therepast. Accordingly, a pair of pressure members 20 are provided, each to insure effective intimate contact of the checks with a respective one of the transducers 11 or 12.

As illustrated, the pressure members 20 resiliently press the checks 10 against a very thin (such as about .00025 inch thick) non-magnetic steel tape or stripe 21 that passes around a grounding pin 22 between the transducers 11, 12 and passes in intimate contact over the gap portion of the transducers. The tape 21 may be stationary; however, it is preferably moved very slowly (such as about one inch per hour) in a direction opposite to that of the check feed by suitable means (not shown). The purpose of this tape 21 is to prevent the abrasive action of successive fast-moving checks from wearing the brass jackets 23 around, and the laminations of, the magnetizable soft iron cores 24 of the electromagnetic transducers 11 and 12. The term "effective contact," as herein used, is intended to refer generically to direct contact of the check and/or magnetic characters with a transducer or to indirect contact thereof such as via a wear-reducing tape 21 of the type just described.

Each pressure member 20 comprises a cylindrical hub 25 and a plurality of independently flexible bristle-like low-inertia fingers 26 that normally project radially outwardly from the hub. These fingers extend across the entire width of the hub 25 and are densely arranged around said hub so as to be of uniform density over the entire periphery of the hub. Thus, substantially constant pressures will be exerted by the fingers 26 against a particular check 10 irrespective of which grouping of fingers may happen to be in physical contact with the check. These fingers 26 may be of metallic material, such as Phosphor bronze, or non-metallic material, or any other material providing a spring rate and wear characteristics suitable for high speed operation. A generally U-shaped magnetic shield 27 surrounds each member 20 except for the portion thereof facing the tape 21. An additional shield 28 preferably is also used to shield the transducer 11, 12 from each other.

In FIG. 2, the hub 25 associated with transducer 11 is shown secured to a shaft 29 suitably supported in spacer bearings 30 and driven by a belt-driven pulley 31. By this or some other suitable arrangement, each member 20 is rotated at a velocity sufficient to prevent the leading edge of any check 10 from overtaking and being mutilated by the fingers 26. In other words, the lineal speed of the outer periphery of each finger 26 must be slightly greater than the linear transport speed of the check so that after the fingers are deflected by contact with a check (see FIG. 3B), the velocity of the fingers at the points of such contact will be at least equal to the transport speed imparted to the check by drum 13 and belt 14. On the other hand, the velocity of the fingers when in contact with a check should not be substantially greater than the transport speed; otherwise, the fingers will abrade and possibly tear or damage the check by tending to drive the inner part of the check faster than the middle part of the check is being positively driven by the drum 13 and belt 14.

The improved reliability obtained by use of the pressure members 20 can best be understood by referring to FIGS. 3A, 3B and 3C. Assume initiallly that a check 10 having a fold or crease at X approaches the transducer or read head 12. As shown in FIG. 3A, the fingers, like 26a, just ahead of the fold X will be deflected a normal amount corresponding to the thickness of that check; and the fingers, like 26b, not yet in contact with the check will be fully extended. As the fold X approaches the tangent point of member 20, the fingers 26b now in contact with the fold will be deflected unduly toward the hub 25, as shown in FIG. 3B, due to the increased localized thickness of the check resulting from said fold; however, those fingers, like 26c, contacting the portion of the check just to the rear of said fold will be deflected less than those contacting said fold because each finger is flexible independently of the others; and the fingers, like 26d, not yet in contact with the check will be fully extended. As the fold X moves past the tangent point of member 20 to the position shown in FIG. 3C, the unduly deflected fingers 26b will start to straighten; but the normally deflected fingers 26c which contacted the check immediately behind the fold X will maintain the portion of the check immediately after the fold in effective intimate contact with the transducer without regard to the position or condition of the fingers 26b.

It is to be noted that the magnetic heads 11, 12 are preferably "contoured'" as shown. In other words, the gap portion of each head is flat; and each brass jacket 23 has ground or beveled surfaces 23a, 23b which are contacted by tape 21 and extend back at equal angles, such as about 12°, from the gap portion. This beveled configuration of the jacket 23 assures (see FIGS. 3A, B. C) that the crease of fold X will be in contact with the transducers or heads 11, 12 for a minimum amount of time. The fingers 23 will not be unduly deflected until the fold X is at the gap, thus assuring more effective contact of the check with the head 11 or 12.

It should also be noted that the fingers 26 are not provided to "iron out" the fold or crease. They exert far too little pressure to do this. The improved result is achieved because the fingers 26 are densely arranged around the hub 25 and flexible independently of each other. When the pressure members 20 are used, a discontinuity (such as a crease or fold) in a check will cause only a relatively insignificant reduction in the signal level of the electro-magnetic transducer 11 or 12, as shown by curve 32, which represents the envelope for the modulated A.C. signal. The points A, B and C in FIG. 4 correspond to the times depicted in FIGS. 3A, B and C, respectively. The envelope-representing curve 33 indicates the substantially greater magnitude and duration of the drop in modulated A.C. signal level experienced when a crease or fold is encountered by a pressure device of the resilient roller type heretofore proposed.

By actual comparison tests, it was found that rejects due to folds and creases were drastically reduced by a ratio of over 115 to 1. In other words, when using the improved pressure members 20, there were over 115 times fewer checks stacked in a reject pocket due to inability to recognize or reliably read as incomplete character as a result of folds and creases.

While the invention has been particularly shown and described with reference to a preferred embodiment thereof, it will be understood by those skilled in the art that various changes in form and details may be made therein without departing from the spirit and scope of the invention.

What is claimed is:

1. Means for maintaining a document in effective contact with a transducer as it is moved relative to the transducer, said means including a rotary member having a plurality of bristle-like independently flexible fingers densely arranged around and projecting outwardly therefrom, said fingers normally being fully extended and being adapted to yield individually so that collectively they will resiliently bias the document into such effective contact as they are successively rotated into contact with the document, thereby to maintain the document in such effective contact despite any discontinuity in the document which may have caused excessive yielding and deflection of preceding fingers.

2. Means for maintaining documents in effective contact with a stationary transducer as they are moved successively past the transducer, said means comprising a member having a hub-like portion and plurality of bristle-like fingers densely arranged around and normally projecting substantially radially outward from said portion, and means for rotating the member fast enough so that the peripheral speed of the fingers when fully extended is greater than the lineal speed of each document to prevent mutilation of the leading edges of the documents as the fingers are successively rotated into contact with each document, said fingers normally being fully extended at the instant they contact a document and being adapted to yield individually to resiliently press each document into effective contact with the transducer despite any discontinuities in the document which may have caused undue deflection of a preceding finger.

3. Means for maintaining documents in effective contact with an electro-magnetic transducer as the documents are moved successively past the gap portion of the transducer, said means comprising a member having a generally cylindrical surface and a plurality of bristle-like independently flexible fingers densely arranged around and normally projecting generally radially outward from said surface and of substantially identical length and configuration so that irrespective of which fingers may happen to contact the document such fingers collectively will exert substantially uniform degrees of resilient pressure on such document to maintain it in effective contact with the gap portion of the transducer, and means for rotating the member at a velocity sufficient to prevent the leading edges of the document from overtaking and being mutilated by said fingers.

4. In combination, means for advancing documents successively along a defined path, a stationary magnetic transducer disposed at one side of the path for performing a desired operation on magnetic character indicia on a portion of each document offset laterally from said advancing means, a rotary member at the opposite side of the path and opposite said transducer having a plurality of outwardly projecting independently flexible low inertia fingers which successively contact and resiliently press each document toward effective contact with the transducer, and means for rotating the member at a velocity sufficient to prevent the leading edges of the documents from overtaking and being mutilated by the fingers, whereby successive fingers are brought in rapid succession into contact with each document to assure effective contact of the document with the transducer and thus complete an accurate performance of the operation on such indicia despite any discontinuities in the documents.

5. The combination according to claim 4, wherein the fingers are densely arranged across the entire width and around the entire periphery of the member such that a substantially constant pressure is exerted over the entire width of said portion of the document as the various fingers come into contact with such document.

References Cited by the Examiner

UNITED STATES PATENTS

| 1,086,120 | 2/1913 | Allen | 271—51 |
| 2,434,111 | 1/1948 | Hawley | 226—53 |

FOREIGN PATENTS

| 172,296 | 2/1923 | England. |

MALCOLM A. MORRISON, *Primary Examiner.*

WALTER W. BURNS, JR., *Examiner.*